B. PARMENTER.
AUTOMOBILE PEDAL LOCK.
APPLICATION FILED SEPT. 29, 1919.
1,343,405.
Patented June 15, 1920.
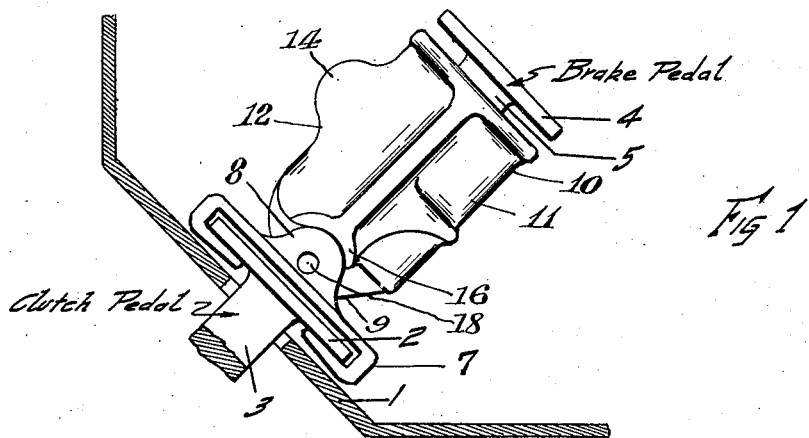
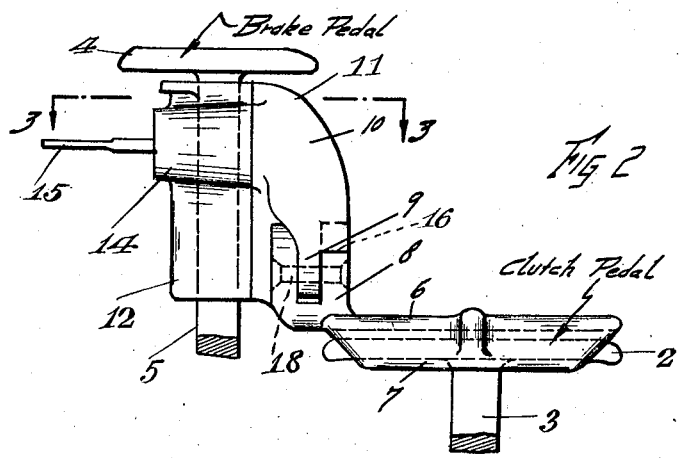
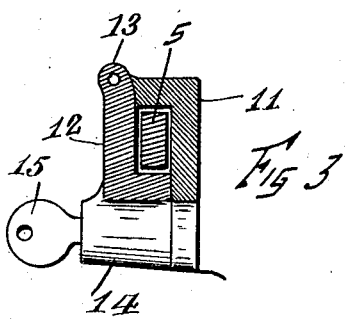
INVENTOR
BRADY PARMENTER
BY
ATTORNEY

UNITED STATES PATENT OFFICE.

BRADY PARMENTER, OF BIRMINGHAM, ALABAMA, ASSIGNOR, BY DIRECT AND MESNE ASSIGNMENTS, TO A. L. ATWOOD, OF BIRMINGHAM, ALABAMA.

AUTOMOBILE-PEDAL LOCK.

1,343,405. Specification of Letters Patent. Patented June 15, 1920.

Application filed September 29, 1919. Serial No. 327,318.

*To all whom it may concern:*

Be it known that I, BRADY PARMENTER, a citizen of the United States of America, residing at Birmingham, in the county of Jefferson and State of Alabama, have invented certain new and useful Improvements in Automobile-Pedal Locks, of which the following is a specification.

My invention relates to an improved locking device adapted to be applied to the brake and clutch pedals of automobiles to lock them in such relative position that it is not possible to drive a car, thereby preventing theft or unauthorized use thereof.

More particularly the object of my invention is to provide a pair of pedal engaging members, preferably hinged together, the one being adapted to interlock with the clutch pedal and when such pedal is in depressed position holding the clutch disengaged the other member is adapted to be locked about the brake pedal shank in such manner as both to prevent the operation of the brake pedal and the return movement of the clutch pedal. As a result the clutch pedal is held in position with the clutch disengaged and the brake so held in position where it cannot be applied. The hinging of the lock sections is to adapt them to fit different makes of cars and to make it easier to lock about the brake pedal shank.

My invention also comprises the novel details of construction and arrangements of parts, which in their preferred embodiment only are illustrated in the accompanying drawings, in which:—

Figure 1 illustrates my invention in operating position viewed in side elevation.

Fig. 2 is a front view of Fig. 1; and

Fig. 3 is a sectional view taken on the line 3—3 of Fig. 2.

Similar reference numerals refer to similar parts throughout the drawings.

In the preferred embodiment of my invention illustrated, 1 represents the floor of an automobile having the usual clutch pedal 2 provided with a shank 3 and the brake pedal 4 provided with a shank 5. The shanks are juxtaposed and, as is normally the case, are arranged side by side and are depressible in substantially the same direction.

My safety lock appliance comprises a base member 6 provided on each side with clamp flanges 7. The member 6 is adapted to be slipped sidewise onto the clutch pedal 2 with the clamp arms 7 engaging under the edges of the pedal and preventing the member 6 being disengaged therefrom except by an endwise movement for the full length of the clutch pedal. The base member 6 at its end nearest the brake pedal has a pair of integral perforated lugs or ears 8 which are upturned and adapted to receive between them a perforated lug 9 on the bottom of the lock member 10. This member 10 comprises two clamped sections 11 and 12 which are hinged together at 13 and are shaped to form between their meeting faces a recess for the brake pedal shank. The sections are also provided with a lock 14 controlled by a key 15 and adapted to interlock the sections 11 and 12. These sections, it will be noted in Fig. 2, extend downwardly being spaced from the lug 9 and lying closely alongside the outside lug 8. The member 10 has curved bearing portions 16 which rest on each side on the curved tops of the lugs 8 so as to take any thrust off of the pivot pin 18 which connects the members 6 and 10 and which is riveted in place to prevent its easy detachment. The member 10 is so proportioned that when the clutch pedal is in its lowered position with the clutch disengaged the member 10 will embrace the brake pedal shank and engage the underface of the brake pedal so as to prevent the clutch pedal rising sufficiently to engage the clutch. Preferably the member 10 is of such length that when the clutch pedal is depressed the base member 6 will engage the car floor and prevent the brake pedal moving sufficiently to apply the brake.

In operation, the members 11 and 12 being unlocked, the device is applied by slipping the base member 6 over the clutch pedal while depressed and then rocking the member 10 on its pivot pin until its members 11 and 12 can be locked about the brake pedal shank, after which the car is locked against unlawful use, due to the fact that the clutch cannot be engaged to connect the engine and drive shaft.

This invention is not intended to be restricted in scope to the specific embodiments shown, but contemplates such modifications as come within the spirit and scope of the claims.

Having thus described my invention, what

I claim as new and desire to secure by Letters Patent, is:—

1. An anti-theft device for automobiles comprising, in combination, undercut means to slip over and interlock with a clutch pedal, in combination with means adapted, while said clutch pedal is depressed, to embrace the shank of an adjacent pedal and form a chock between the two pedals to prevent sufficient relative movement between them to permit the clutch pedal to engage the clutch.

2. An anti-theft device for automobiles comprising, in combination, a base member undercut and adapted to slip laterally onto the clutch pedal and interlock therewith, and a top member carried by the base member and adapted, when the clutch is depressed, to be locked about the shank of an adjacent pedal shank and to engage the underface of such pedal to form a chock adapted to prevent the clutch pedal resuming a "clutch engaging" position.

3. In an anti-theft device for automobiles, two heavy metal castings pivotally connected and disposed substantially at right angles to each other, one member having underhung parts adapted to interlock with the clutch pedal, and the other member having a vertical socket to embrace an adjacent brake pedal shank and engage the brake pedal to restrain the clutch pedal from assuming "clutch engaging" position, said upper member comprising hinged sections, and a key controlled lock for fastening them about the brake pedal.

4. In an anti-theft device for automobiles, a clutch pedal engaging member comprising a metal casting with underhung side flanges adapted to slip onto and interlock with a clutch pedal and having at one end upturned pivot lugs, and a top member pivotally connected to said lugs and having bearing members adapted to engage the curved top of said lugs and bear thereon, said latter member comprising two elongated members adapted to embrace the brake pedal shank and hinged together for relative movement, and a key controlled lock adapted to lock said members about the brake pedal shank when the clutch pedal and the member interlocked therewith have been moved to a "clutch disengaged" position.

In testimony whereof I affix my signature.

BRADY PARMENTER.